United States Patent
Balasubramanian et al.

(10) Patent No.: US 12,457,529 B2
(45) Date of Patent: Oct. 28, 2025

(54) ON-PREMISE MOBILITY FOR ENTERPRISES WITHOUT REQUIRING AN X2 GATEWAY

(71) Applicant: Celona, Inc., Cupertino, CA (US)

(72) Inventors: Srinivasan Balasubramanian, San Diego, CA (US); Vinay Anneboina, San Jose, CA (US); Mehmet Yavuz, Palo Alto, CA (US); Puneet Prabhakar Shetty, San Francisco, CA (US)

(73) Assignee: CELONA, INC., Campbell, CA (US)

( * ) Notice: Subject to any disclaimer, the term of this patent is extended or adjusted under 35 U.S.C. 154(b) by 644 days.

(21) Appl. No.: 17/707,639

(22) Filed: Mar. 29, 2022

(65) Prior Publication Data
US 2022/0322183 A1 Oct. 6, 2022

Related U.S. Application Data (60) Provisional application No. 63/168,476, filed on Mar. 31, 2021.

(51) Int. Cl.
*H04W 36/00* (2009.01)

(52) U.S. Cl.
CPC .............. *H04W 36/0016* (2013.01)

(58) Field of Classification Search
CPC ................ H04W 36/08; H04W 36/0016
See application file for complete search history.

(56) References Cited

U.S. PATENT DOCUMENTS

| | | | |
|---|---|---|---|
| 9,839,055 B2* | 12/2017 | Cartmell | H04W 76/19 |
| 11,057,860 B2* | 7/2021 | Ginsburg | H04W 76/11 |
| 11,445,525 B1* | 9/2022 | Sawczuk | H04W 72/569 |
| 11,871,414 B2* | 1/2024 | Oteri | H04B 7/024 |
| 2002/0021701 A1* | 2/2002 | Lavian | H04L 47/6255 370/412 |
| 2009/0040981 A1* | 2/2009 | Agashe | H04L 1/1887 370/331 |
| 2017/0099617 A1 | 4/2017 | Tomici et al. | |
| 2017/0290049 A1 | 10/2017 | Reisslein et al. | |

(Continued)

FOREIGN PATENT DOCUMENTS

KR 2009/0034527 A * 4/2009

OTHER PUBLICATIONS

Thomas, Shane, International Search Report and Written Opinion received from the USRO dated Jun. 9, 2022 for appln. No. US/PCT22/22375, 7 pgs.

*Primary Examiner* — Ricky Q Ngo
*Assistant Examiner* — Andrew Shaji Kurian
(74) *Attorney, Agent, or Firm* — Jaquez Land Greenhaus & McFarland, LLP; Bruce W. Greenhaus (57) ABSTRACT

Communications are transferred from being including a connection between User Equipment (UE) and a source node to including a connection between the UE and a target node, without requiring use of an X2 gateway. The method includes (1) ceasing to send messages from a source node, along the communications path, to User Equipment (UE), (2) then waiting a period of time, and (3) after the waiting, beginning to send messages along a new communication path from the target to the UE. The period of time is chosen to be adequate for flushing messages from a queue associated with the first communication path.

20 Claims, 7 Drawing Sheets

(56) References Cited

U.S. PATENT DOCUMENTS

| | | | |
|---|---|---|---|
| 2018/0352416 A1* | 12/2018 | Ryu | H04W 4/08 |
| 2020/0229273 A1* | 7/2020 | Routt | H04L 43/045 |
| 2021/0337422 A1* | 10/2021 | Jeyabalan | H04W 28/086 |
| 2022/0276639 A1* | 9/2022 | Brain | G05B 19/41855 |
| 2023/0300684 A1* | 9/2023 | Gupta | H04W 8/02 |
| | | | 370/331 |

* cited by examiner

ON-PREMISE MOBILITY FOR ENTERPRISES WITHOUT REQUIRING AN X2 GATEWAY

CLAIM OF PRIORITY TO PREVIOUSLY FILED PROVISIONAL APPLICATION—INCORPORATION BY REFERENCE

This utility application claims priority under 35 USC section 111 (b) and under 35 USC section 119 (e), to earlier-filed provisional application No. 63/168,476 filed Mar. 31, 2021, entitled "X2 Gateway Without On-Premise Mobility for Enterprises""; and the contents of the above-cited earlier-filed provisional application (App. No.: 63/168,476) are hereby incorporated by reference herein as if set forth in full.

BACKGROUND

(1) Technical Field

The disclosed method and apparatus relate generally to communication systems. In particular, the disclosed method and apparatus relate to providing mobility within networks with a Multi-Operator Core Network Gateway and connectivity to a Mobile Network Operator core.

(2) Background

In some Mobile Network Operator (MNO) communications networks, one of the key components is a core network (hereafter referred to simply as a "core"). Communications between network resources and mobile devices that are attempting to communicate with the network resources flow through the MNO core.

Figure 1:
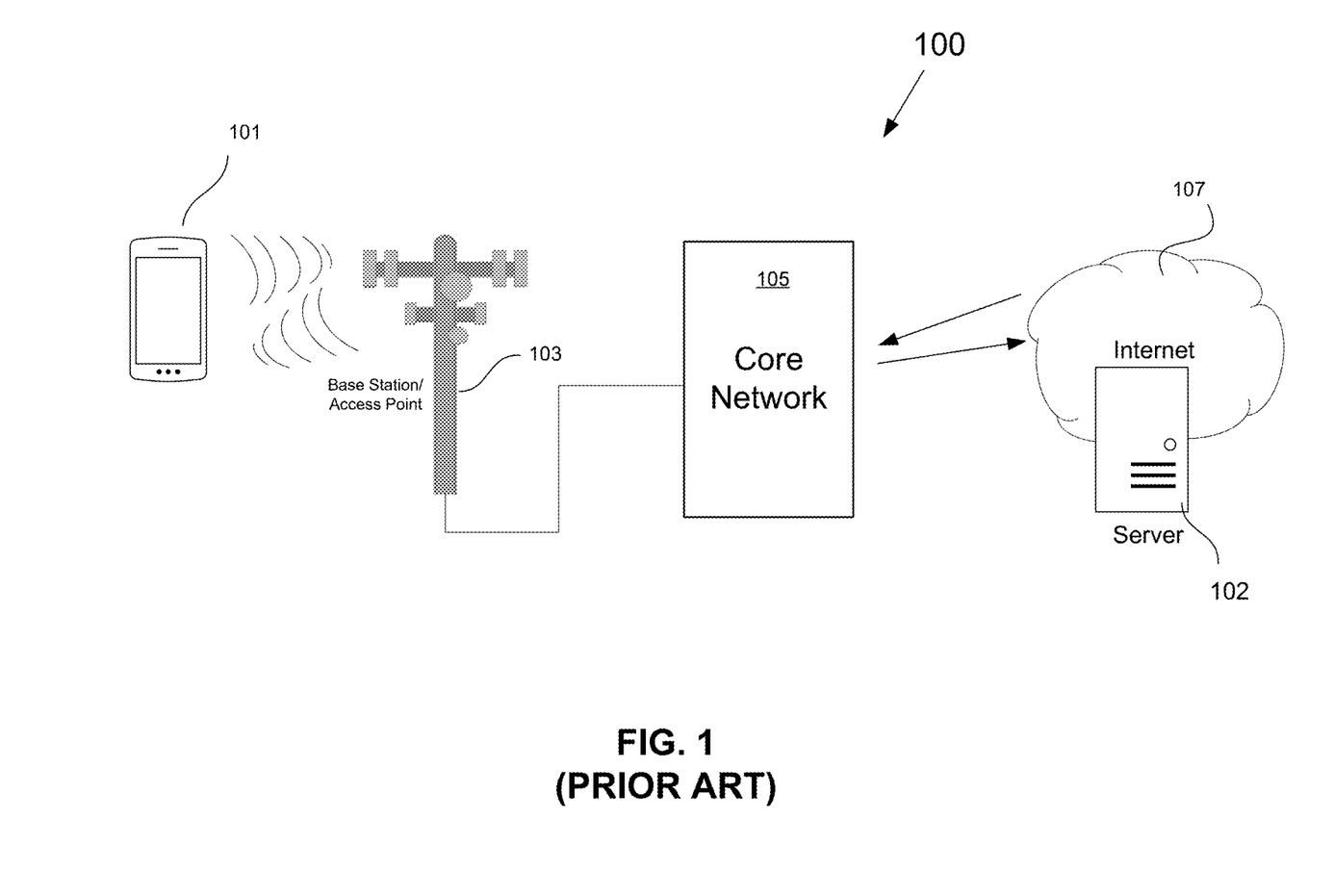
FIG. 1 shows a basic configuration for a communication network.

FIG. 1 shows a basic configuration for a communication network 100, such as a "4G LTE" (fourth generation Long-Term Evolution) or "5G NR" (fifth generation New Radio) network, in which user equipment (UE) 101 communicates with network resources, such as a server 102. In some cases, the server is capable of hosting features, some of which may be implemented by accessing applications that can be made available to the UE 101. Communication between the UE 101 and the server 102 is provided through a base station/access point (BS/AP) 103 and the MNO core 105. The term UE refers to a wide array of devices having wireless connectivity, such as a cellular mobile phone, Internet of Things (IoT) device, virtual reality goggles, robotic device, autonomous driving machine, smart barcode scanner, and communications equipment. Communications equipment includes desktop computers, laptop computers, tablets and other types of personal communications devices.

Throughout this disclosure, the term BS/AP is used broadly to include at least: (1) an Evolved Node B (eNB) or Universal Terrestrial Radio Access Network (E-UTRAN) Node B) of a 4G network; (2) a gNB (5G node B) of a NR/5G network; (3) a cellular base station; (4) a Citizens Broadband Radio Service Device (CBSD); (5) a WiFi access node; (6) a Local Area Network (LAN) access point; (7) a Wide Area Network (WAN) access point, etc. The term BS/AP should also be understood to include other network receiving hubs that provide wireless access to a network via at least one wireless transceiver.

In some cases, a UE 101 uses a BS/AP 103 to gain access to a plurality of networks that in-turn provide access to other devices and services. These networks may consist of both public networks and enterprise networks. The industry standards that define 5G technology support both public networks and enterprise networks. Public networks include networks that are open to any subscriber, such as cellular networks. Enterprise networks are typically networks for which access is restricted to members of a particular organization or "enterprise", such as a network established by a company for use by their employees. Network administrators typically determine whether a particular UE has access to the network. In many such cases, access is controlled by allowing access to only those UEs to whom proper credentials have been provided by the network administrator. Often, the credentials comprise a digital code that is encrypted on a Subscriber Identification Module (SIM) card. The BS/AP 103 is coupled to a core 105 that manages traffic through the BS/AP 103 and connectivity (i.e., access) to resources, such as the internet 107.

Figure 2:
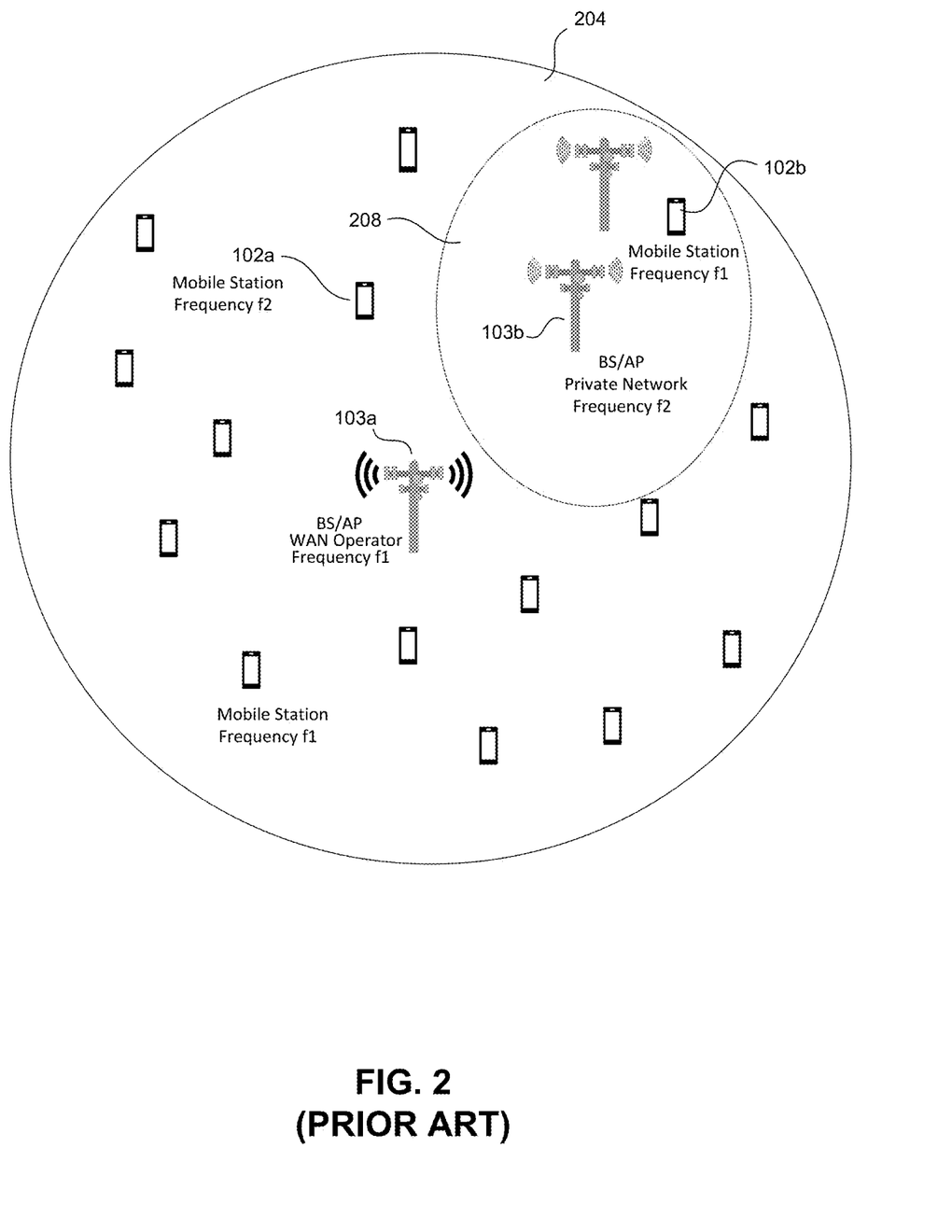
FIG. 2 is an illustration of a larger network configuration.

FIG. 2 is an illustration of a larger network 204, such as a 5G cellular network operated by an MNO, sometimes referred to as a wireless service provider. Within the geographic operating area of the MNO network 204, an enterprise network 208 may be established by a private network operator, such as an enterprise network operator (ENO). BS/APs 103a of the MNO network 204 may service a plurality of UEs 101. Each UE 101 may be present within a coverage area of the MNO network 204 that operates on a first frequency f1. In some cases in which the enterprise network 208 is located within the geographic footprint of the MNO network 204, one or more enterprise network BS/APs 103 may provide connectivity over a second frequency, f2 to allow UEs 101 within the geographic footprint to access the enterprise network 208. Alternatively, BS/APs 103b, within the enterprise network, provide wireless connectivity between the UE 102b within the operating area of the enterprise network 208 and an enterprise Evolved Packet Core (EPC).

It should be noted that throughout this disclosure, communications are discussed in which "packets" are "routed", "transmitted" and "received". However, packets are merely one example of communications and embodiments are not limited to packets, as communications may take other forms as well.

Figure 3:
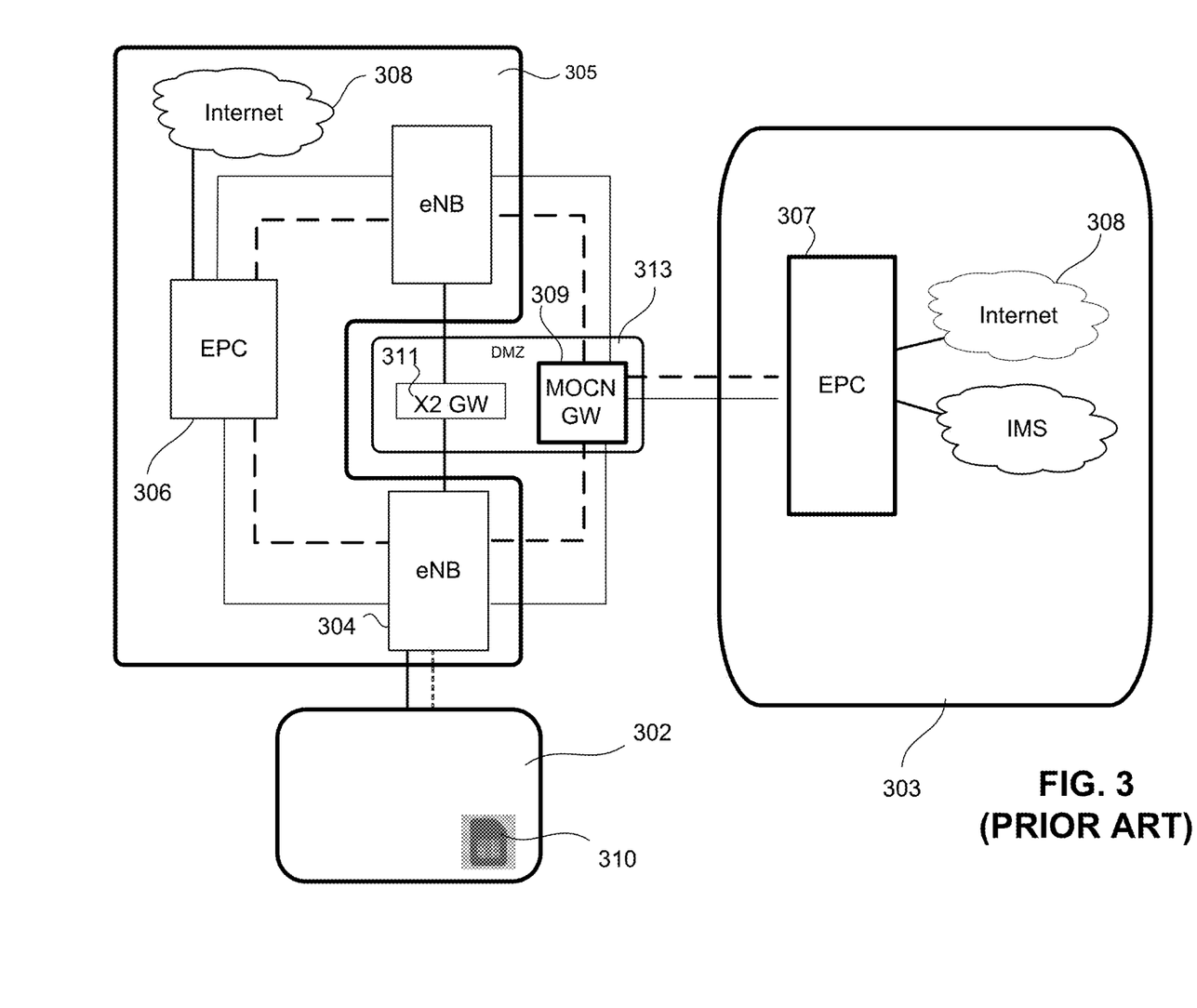
FIG. 3 shows a configuration in which a within the coverage area of an enterprise network can communicate with the MNO network through an enterprise BS/AP.

FIG. 3 shows a configuration in which a UE 302 within the coverage area of an enterprise network 305 can communicate with the MNO network 303 through an enterprise BS/AP (i.e., eNB) 304, such as a CBSD. Some enterprise networks 305 provide a communication service that allows their subscribers to establish a communication link to an MNO network's infrastructure (e.g., an MNO core 306, such as an MNO EPC) through the physical radio infrastructure of the enterprise network 305. An architecture in which more than one core 306, 307 can be accessed through the same BS/AP is commonly referred to as a Multi-Operator Core Network (MOCN). In such cases, a gateway, such as a MOCN gateway (GW) 309, resides between the eNB 304 and one or more cores, each of which can be accessed by a UE 302 through the eNB 304. In some cases in which the eNB 304 is part of the enterprise network 305, the eNB 304 is connected directly to the enterprise core (i.e., EPC 306). Nonetheless, packets that flow between the UE 302 and the MNO EPC 307 flow through the MOCN GW 309, which directs packets that flow from the UE 302 through the eNB 304 to the appropriate core 307.

While only one such core 307 is shown, it should be understood that there may be other such cores as well. An enterprise network subscriber UE (hereafter, simply referred to as a "EUE") 302 within the coverage area of an enterprise network 305 may be connected to the enterprise eNB 304. The enterprise eNB 304 is part of the enterprise network 303; but is connected to the MNO network 303 through the MOCN GW 309. Accordingly, the enterprise eNB 304 can be used to connect the UE 302 to the MNO network's EPC 307.

Figure 4:
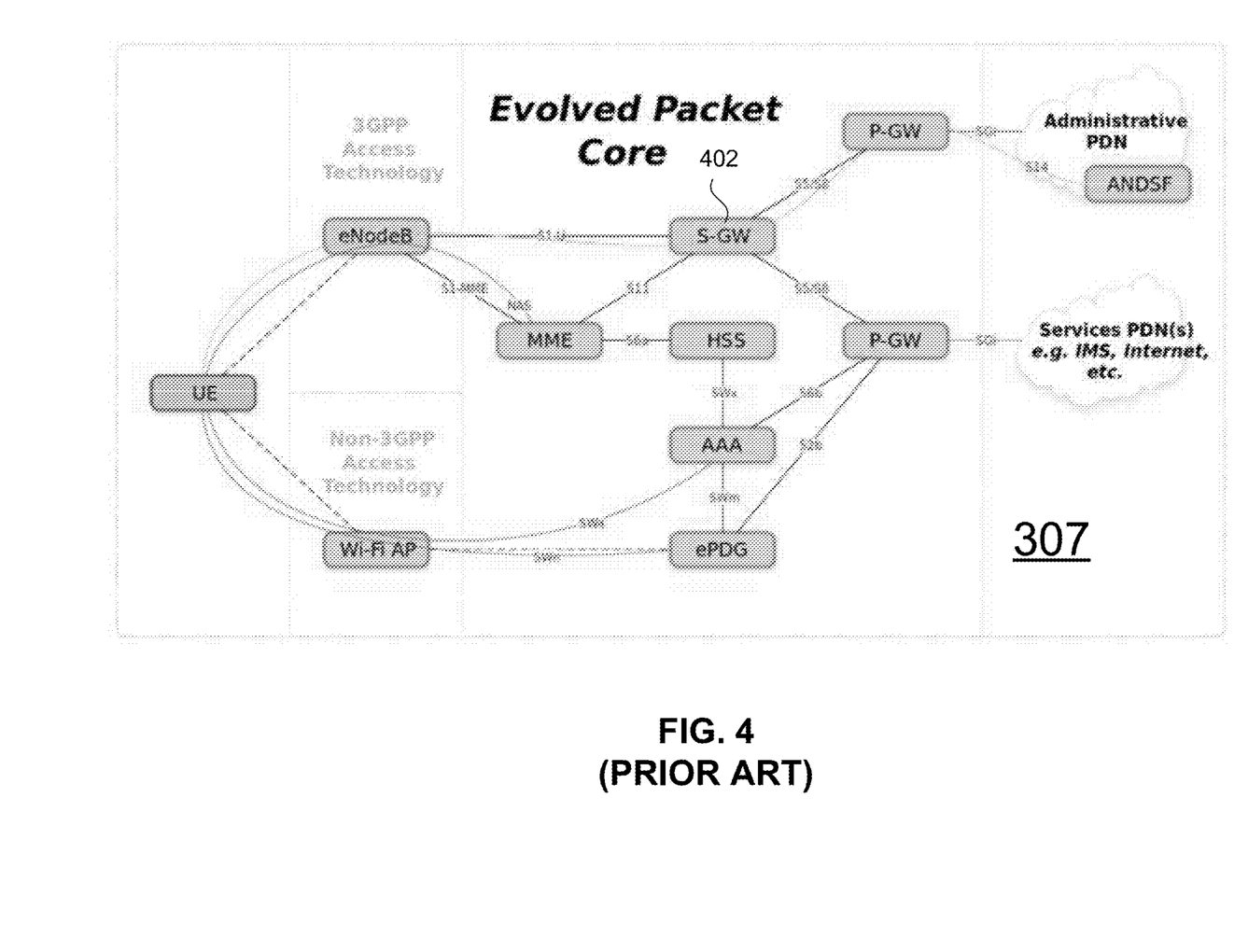
FIG. 4 is a simplified block diagram of the components of an EPC, such as the MNO EPC shown in FIG. 3.

FIG. 4 is a simplified block diagram of the components of an EPC, such as the MNO EPC 307 shown in FIG. 3. The EPC 307 comprises an MME (Mobility Management Entity) 402, SGW (Serving Gateway) 404, at least one PGW (Packet Gateway) 406, HSS (Home Subscriber Server) 408, ePDG (evolved Packet Data Gateway) 410, etc. The SGW routes UE 302 data packets to a Packet Data Network (PDN) 412. Accordingly, the MNO EPC 307 can establish a connection to an outside PDN 412 and thus provide connectivity to the internet 308 or to other external services. That is, while the EUE 302 uses the enterprise eNB 304, the MOCN GW 309 provides access to the MNO EPC 307 to allow the EUE 302 to control data flows to the MNO's EPC 307 and the resources that are available through that MNO's EPC 307.

In most network architectures, secure communications between the BS/AP and each of the networks is important. For architectures in which there are several possible sources and destinations for communications to and from the BS/AP, there is a need for security measures. In some such cases, the network uses what is sometimes referred to as a Demilitarized Zone (DMZ) to provide a secure buffer between each core and the components outside of each core, such as BS/APs and some of the resources to which one or more of the core can provide access for those UEs that are attempting to access such resources through the BS/APs.

For deployments in which connectivity to an MNO core 307 is based on a MOCN GW based in a DMZ 313, having the MOCN GW in the DMZ 313 ensures the security of the enterprise. In deployments that further have CBSDs 304 deployed on the enterprise premises, an X2 GW 311 is used to provide mobility and may also reside in the DMZ 313. "Mobility" refers to the ability to allow a UE to change the particular BS/AP through which the UE is accessing the MOCN GW. In some such cases, the MOCN GW 309 and the X2 GW 311 may reside at a location that is remote from the enterprise premises. In some cases, the DMZ based equipment may reside far from the networks serviced by the equipment within the DMZ. In some cases, inter-eNB mobility (i.e., changing the BS/AP through which a UE communicates) requires traffic originally sent to a source eNB to be sent to a target eNB once the connection from the source eNB to the UE is broken. Such routing is done through the X2 gateway 311. Accordingly, having the X2 GW 311 and the MOCN GW 309 remotely located in the DMZ can result in traffic originally routed to the source eNB, having to be routed out to the DMZ and then back into the enterprise campus. In some cases, the BS/AP is an CBSD within a Citizens Broadband Radio Service (CBRS) of an enterprise network. The following is a brief description of the process that occurs when a UE that is being served by an enterprise network eNB 304 determines that the air interface is no longer sufficient to support access by the UE 302 through that eNB 304 or that there is another eNB 312 that has a better air interface to the UE 302.

Figure 5:
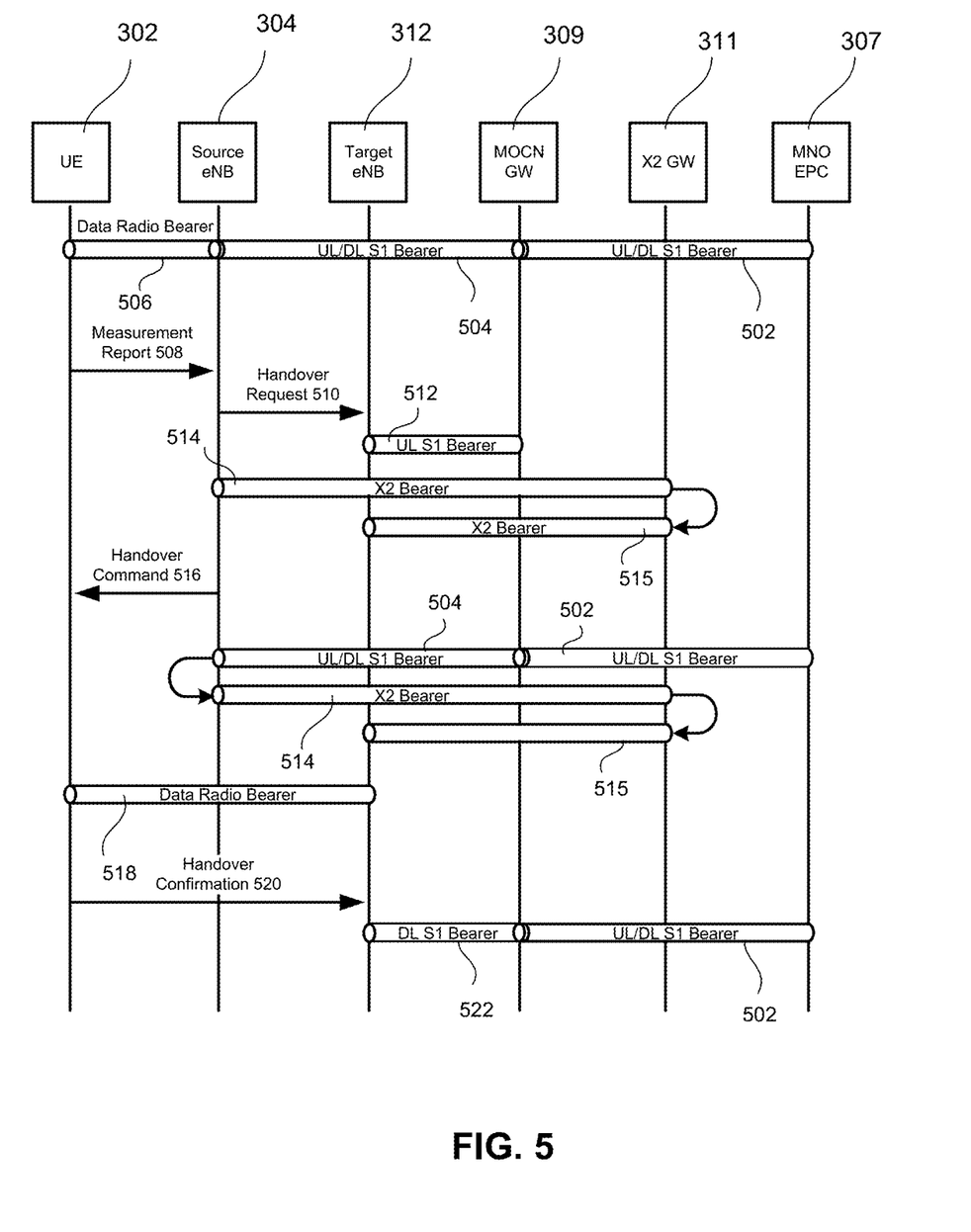
FIG. 5 is a simplified flowchart of the process that takes place between the elements of the communications system.

FIG. 5 is a simplified flowchart of the process that takes place between the elements of the communications system. Initially, traffic between the MNO EPC 307 and the UE 302 traverses a path that flows through a first S1 "bearer" 502 between the EPC 307 and the MOCN GW 309, a second S1 bearer 504 between the MOCN GW 309 and a source eNB 304, and a data radio bearer 506 between the source eNB 304 and the UE 302. The UE 302 sends a "Measurement Report" 508 to the source eNB 304 (i.e., the eNB that is currently providing access for the UE 302 to the MNO network 307), indicating particular conditions of the data radio bearer 506 and the radio link with other BS/APs based on signals from the eNB 302 and from the other BS/APs. Upon the source eNB 304 determining from the Measurement Report 508 that there is a more preferred target eNB 312 available, the source eNB 304 sends the target eNB 312 a handover request 510. In response to the handover request 510, the target eNB 312 establishes an uplink (UL) S1 bearer 512 (i.e., a secure communications link from the eNB 312 to the MOCN GW 309). Note that this S1 bearer 512 is only for uplink traffic and does not support downlink (DL) traffic yet.

Next, the target eNB 312 establishes an X2 bearer between the target eNB 312 and the source eNB 304 through the X2 GW 311. Accordingly, a first X2 bearer 514 is established between the source eNB 304 and the X2 GW 311 and a second X2 bearer 515 is established between the X2 GW 311 and the target eNB 312. The source eNB 304 then sends a handover command 516 to the UE 302. In response, the UE 302 detaches from the source eNB 304 and attempts to connect to the target eNB 312. Since a downlink S1 bearer between the MOCN GW 309 and the target eNB 312 has yet to be established, the MOCN GW 309 continues to send traffic intended for the UE 302 to the source eNB 304 through the S1 bearer 504 to maintain the data flow. However, since the source eNB 304 is no longer connected to the UE 302, the source eNB 304 caches the data and routes the traffic to the target eNB 312 through the established X2 bearer 514 to the MOCN GW 309, which then sends the traffic to the target eNB 312 over the X2 bearer between the MOCN GW 309 and the target eNB 312.

The target eNB 312 will typically not yet be connected to the UE 302 (i.e., confirmation of the handover command 516 is not yet received by the MOCN GW 609). Therefore, the target eNB 312 caches the traffic for transmission over the data radio bearer that will soon be established between the UE 302 and the target eNB 312. Once the data radio bearer 518 is established between the target eNB 312 and the UE 302, the handover confirmation 520 is sent from the UE 302 to the target eNB 312. Accordingly, data that has been cached by the target eNB 312 can be sent to the UE 302 over that data radio bearer 518. The target eNB 312 then sends a path switch request to the MOCN GW 309 to cause the MOCN GW 309 to switch from the S1 bearer 504 to the source eNB 304 to a new S1 downlink bearer 522 to be established from the MOCN GW 609 to the target eNB 312. Upon establishing the S1 downlink bearer 522, the MOCN GW 309 modifies the packet route to allow packets to flow directly through the downlink S1 bearer 502 from the EPC 307 to the MOCN GW 309. Traffic then flows through the S1 downlink bearer 522 to the target eNB 312. The target eNB 312 then sends the packets to the UE 302 through the data radio bearer 518.

In this way, traffic continues to flow as the handover process is performed without interruption to the traffic.

While this process is effective at maintaining the traffic flow during the handover process, having the X2 GW in the DMZ causes unnecessary traffic "tromboning" between the on-premises network (i.e., the eNBs) and the DMZ (i.e., the X2 GW 511), which is deployed on a central platform across all campus locations. Tromboning is a situation that occurs when data is transferred through a path that goes to a large exchange node and back. In this case, the data is sent to the on-premises source eNB 304, only to be sent back out to the off-premises X2 GW 511 (which may reside in a distant DMZ), which in turn sends the traffic back to the on-premises target eNB 512. In some cases, the distance between the enterprise campus and the location of the X2 GW can be significant, leading to relatively longer latency than is necessary, as well as increases in the "jitter" due to variations in the latency.

In some embodiments, the X2 GW is a gateway used for X2 signaling. In some embodiments, the X2 signaling bearers provision the transfer of X2-AP messages over an X2 interface. The X2 signaling allows networking and routing functions to be established. The X2 GW provides redundancy in the signaling network. The X2 signaling bearer supports flow control and congestion control. In the prior art, an X2 GW is used because it is thought to perform the handover efficiently, and thus in the prior art, usage of the X2 GW is seen as important.

Alternative methods can be established in which sophisticated flow control algorithms are developed with traffic buffers being retained in the DMZ. In such alternative methods, minimum traffic is forwarded to the CBSD while ensuring the channel resources are not wasted and the relative QoS prioritizations are maintained. However, such an alternative method requires a complex algorithm to be developed and implemented.

Handicaps are present in both (1) the use of an X2 GW deployed in the DMZ to provide mobility by rerouting traffic across eNBs via the DMZ, and (2) in the alternative method in which sophisticated flow control algorithms are developed to provide enhanced flow control techniques between the DMZ and on-prem deployed CBSDs. Accordingly, it would be advantageous to provide a system that can provide the desired mobility without the disadvantages presented by these two approaches.

SUMMARY OF INVENTION

Various embodiments of a method and apparatus are provided for transferring communications from a source node to a target node without requiring routing via an X2 gateway. As a result, the communications are along an original path between a UE and the source node before transferring the communications. Whereas, after the transfer, the communications are along a new path, which is between the UE and a target node.

In some embodiments, a delay is imposed between discontinuing transmission of messages from the source to the UE and continuing transmission of the messages from the target to the UE. In some embodiments, the delay is based on predicting the time needed to clear a queue of messages being sent along the original pathway. Delaying the sending of the messages (instead of using an X2 gateway) reduces the possibility that packets will be received out of order as a result of the handover and thus reduces the need to resend packets.

In some embodiments, the source base station/access point (BS/AP) and the target BS/AP are eNBs. In some embodiments, the eNBs are CBSDs. In some embodiments, the enterprise network comprises a source eNB, a target eNB, an enterprise EPC, and a MOCN GW. The enterprise network does not require an X2 GW. In some embodiments, the MOCN GW is located in a DMZ.

In some embodiments, traffic initially flows between a UE and an MNO EPC. In the downlink direction, traffic originates at the MNO EPC and is sent to the MOCN GW over an existing UL/DL S1 bearer. The MOCN GW sends the traffic to a source eNB over another existing UL/DL S1 bearer.

In some embodiments, measurements of the quality of air interfaces to eNBs in the area are made. Such measurements are used to determine whether a handover request needs to be made (i.e., whether to handover communications between the UE and a source eNB to a target eNB. In some embodiments, a Measurement Report is provided characterizing communications quality between the UE and the source eNB to assist in determining whether to implement the handover and/or to assist with determining which eNB to use as a target eNB.

In some embodiments, the handover request is sent to the MOCN GW and indicates the identity of the target eNB to which communications are to be handed over.

In some embodiments, after the sending of packets to the source eNB is stopped, the priority is raised for sending any remaining packets that were previously sent to the source eNB. This ensure that such packets are flushed out of the source eNB and the data radio bearer and that such packets are sent to the UE as quickly as possible.

In some embodiments, the determination of when to start using the target eNB to send packets is based on the amount of traffic currently queued within the source eNB and on the amount of time required to flush those packets from the source eNB. In addition, in some embodiments, the time required to establish an S1 bearer impacts the determination. In some embodiments, the S1 bearer is established before the source eNB has flushed the remaining packets.

In some embodiments, only once all the packets that remained in the source eNB have been flushed (i.e., transmitted from the source eNB to the UE), does the source eNB send a handover command to the UE.

In some embodiments, the MOCN GW starts sending traffic to the target eNB immediately upon determining that all the packets have been flushed from the source eNB.

In some embodiments, a hybrid approach is used in which traffic that is more sensitive to delay is pushed through the data radio bearer between the source eNB and the UE. However, other packets that can tolerate greater delay when being transmitted from the source eNB are sent through an X2 gateway to the target via an X2 bearer. In this way, the packets can be sent over a data radio bearer between the target eNB once that bearer is established.

In some embodiments, predictions regarding the quality of the link and any deterioration of the link are made before significant deterioration occurs, rather than waiting for the conditions to deteriorate before determining that action should be taken. In some such embodiments, upon predicting that conditions will deteriorate, a handover to the target eNB is initiated. In some embodiments, in which a UE has several traffic streams, the handover and timing for each subset of bearers and/or stream are determined independently of the other bearers used for other traffic streams.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

The presently disclosed method and apparatus performs handovers of communications with a User Equipment (UE), the handover occurring between a source Base Station/Access Point (BS/AP) and a target BS/AP. Some embodiments avoid the need to host an X2 gateway (GW) in the demilitarized zone (DMZ) of a network. In addition, the presently disclosed method and apparatus avoid the need for complex flow control logic while providing mobility for User Equipment (UEs) in a network having a Mobile Network Operator (MNO) core that uses a Multi-Operator Core Network (MOCN) GW that is located in the DMZ, with only Citizens Broadband Radio Service Devices (CBSDs) deployed on-premises.

In accordance with one embodiment of the disclosed method and apparatus, when a UE needs to be handed over from one CBSD to another, a sequence of events occurs.

Figure 6:
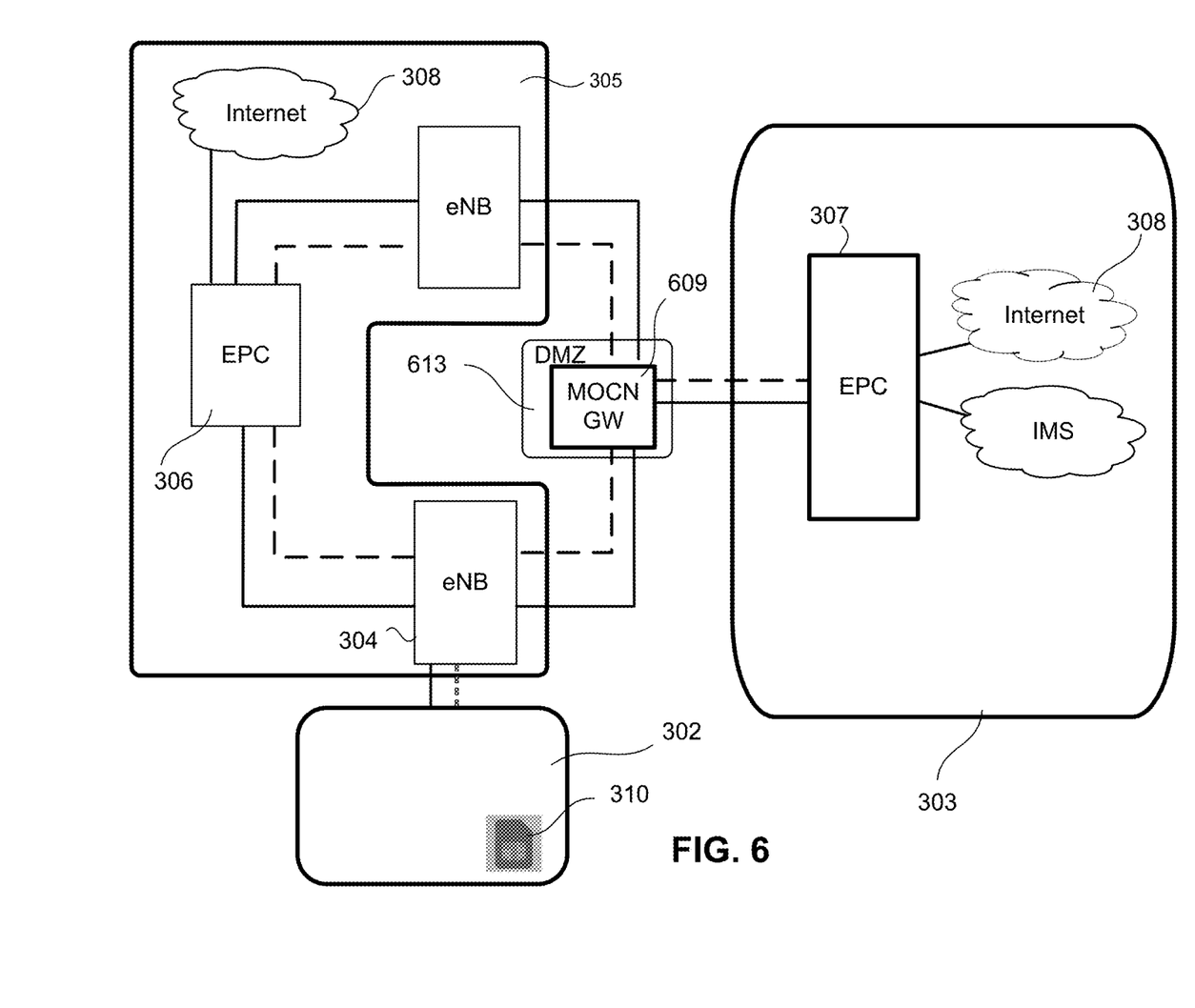
FIG. 6 is a simplified schematic of the components of an enterprise network.

FIG. 6 is a simplified schematic of the components of an enterprise network comprising BS/APs (which in the example shown are Evolved Node Bs (eNBs) 604, 612), an enterprise EPC 606 and a MOCN GW 609. An X2 GW is not required in the enterprise network of the disclosed method and apparatus. In some embodiments, the MOCN GW 609 is located in a DMZ 613. Throughout the present disclosure, various examples of BS/APs are shown. However, it should be noted that any BS/AP (i.e., device capable of wirelessly connecting a UE to a network) may be used. Examples are provided merely to assist in conveying a comprehensible description of the method and apparatus being disclosed.

In the embodiments of FIG. 6, there is a delay between the time at which the source stops transmitting intended information (e.g., messages) to the UE and time at which the target starts transmitting messages to the UE. That is, messages are not sent from the source to the target and then to the UE during the handover. This delay is based on a prediction of the amount of time needed to clear the queue of messages being sent along the original pathway. Implementing this delay makes it less likely that packets will be received out of order as a result of the handover.

Figure 7:
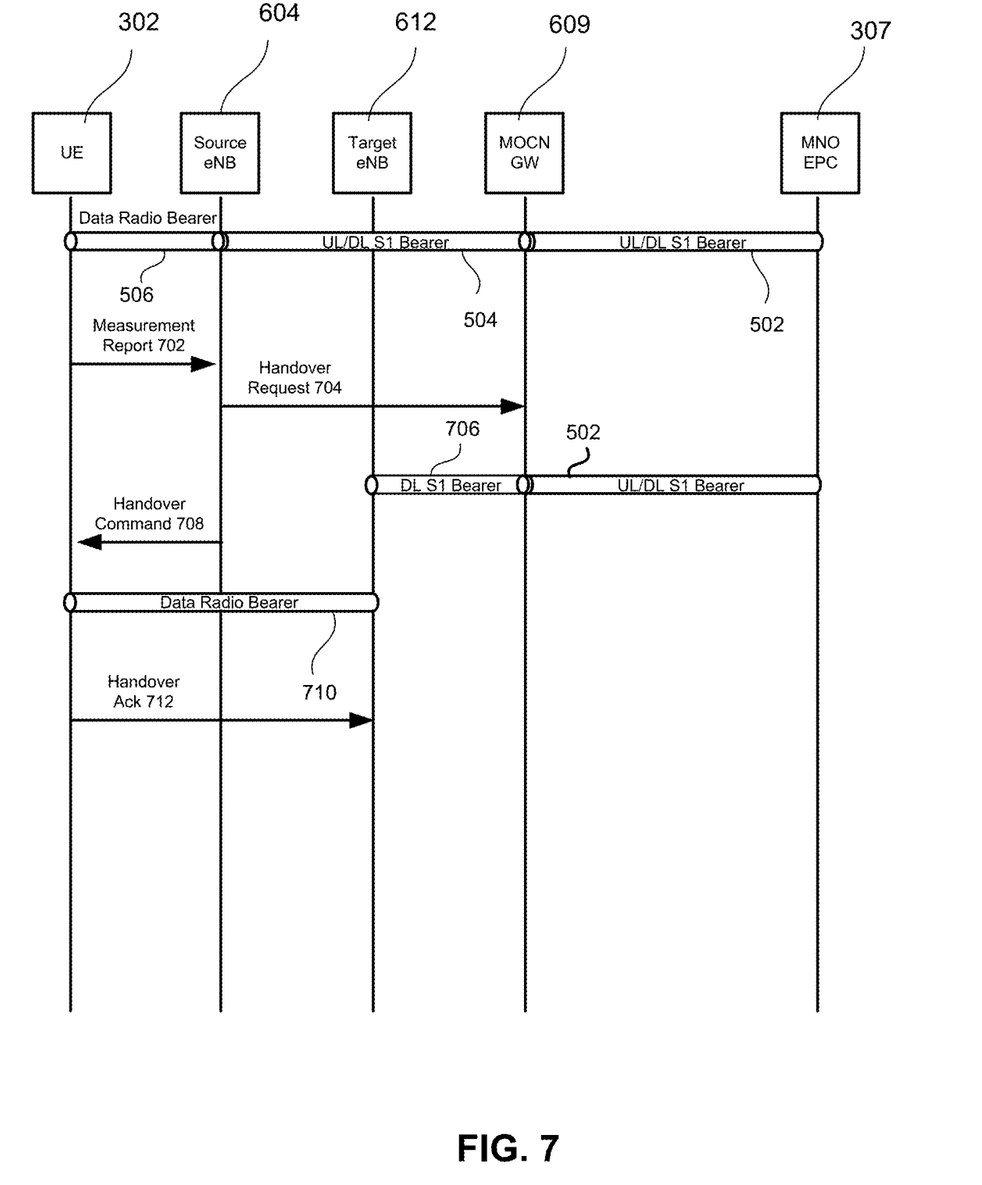
FIG. 7 is a simplified flow diagram of the sequence of events performed in accordance with the method executed by the disclosed apparatus.

FIG. 7 is a simplified flow diagram of the sequence of events performed in accordance with the method executed by the disclosed method and apparatus. Initially, traffic flows between a UE 302 and an MNO EPC 307. In the downlink direction, traffic originates at the MNO EPC 307 and is sent to the MOCN GW 609 over an existing uplink/downlink (UL/DL) S1 bearer 502. Minor differences exist in the way user-plane traffic is handled and the way control plane traffic is handled. For example, some of the control plane traffic terminates at the source eNB 604. However, for the purposes of this disclosure, these differences are not consequential. In either case, the MOCN GW 609 sends the traffic to a source eNB 604 over an existing UL/DL S1 bearer 502 between the MNO EPC 307 and the MOCN GW 609, which then sends the traffic to the source eNB 604 over the S1 bearer 504. The source eNB 604 then transmits the traffic over the data radio bearer 506 to the UE 302.

In a similar manner, uplink traffic flows in the opposite direction, originating at the UE 302 and traversing the data radio bearer 506 through the over the air connection to the source eNB 604. The source eNB 604 sends the traffic to the MOCN GW 609 over the S1 bearer 504. The MOCN GW 609 then, in-turn sends the traffic to the MNO EPC 307 over the S1 bearer 502.

Measurements of the air interfaces to eNBs in the area are made to determine whether the UE 302 needs to be moved from a source eNB 304 (such as a local enterprise CBSD) to a target eNB 312 (such as a Source CBSD). In some situations, such movement might be due to a weak signal in either the air interface to the source eNB 604 or from the eNB 604. In other situations, it may be that the signal to and from a determined target eNB 612 is stronger than the signal to and from the Source eNB 604 through which the UE 302 is currently communicating with the network.

In some embodiments, a Measurement Report 702 is provided from the UE 302 in question to the source eNB 604 (i.e., the CBSD through which the UE is currently communicating with the network). The source eNB 604 makes a determination (either based on the measurements taken by the UE 302 or based on a determination made directly by the UE 302) that a handover would be beneficial. Accordingly, upon making such a determination, the source eNB 604 sends a handover request 704 to the MOCN GW 609, indicating the identity of the target eNB 612. The MOCN GW 609 then ceases sending any further packets to the source eNB 604 and sets up an S1 bearer 706 between the MOCN GW 609 and the target eNB 612. It is possible that some packets may need to be buffered within the MOCN GW 609 while the S1 bearer 706 is being established between the MOCN GW 609 and the target eNB 612.

At this point, the priority is elevated for any traffic (e.g., packets) previously sent to the source eNB 604 and which remain within the source eNB 604. In this way, the traffic (e.g., packets) is flushed out of the source eNB 604 and sent through the data radio bearer 506 to the UE 302 as quickly as possible. In some embodiments, the traffic is sent at as high a priority as possible so as to not be preempted by other packets being transmitted to other UEs over the network that might be competing for network resources.

Accordingly, in response to a message to the MOCN GW 609 that a handover is to occur, the MOCN GW 609 stops sending traffic to the source eNB 604 at a predetermined time. In some embodiments, the predetermined time is immediately upon the MOCN GW 609 determining that a handover is to be implemented. The MOCN GW 609 then determines when to start sending packets to the UE 302 through the target eNB 612 over the S1 bearer 706. In some embodiments, this determination is made based on a prediction of the amount of traffic that is likely to be queued within the source eNB 604 at the time the MOCN GW 609 stops sending traffic through the source eNB 604 (e.g., the number of packets that are likely to be present in the source eNB 604 and which are still to be sent to the UE 302). In some embodiments, the actual amount of traffic that is queued within the source eNB 604 is known. A prediction of the amount of time required to flush that traffic from the eNB 604 is then made based on this knowledge. In other embodiments, a prediction of the amount of traffic queued (e.g., packets received) within the source eNB 604 is used to predict the amount of time required to flush the traffic (e.g., those packets) from the source eNB 604. In addition, in some embodiments, the MOCN GW 609 also determines the amount of time required to establish an S1 bearer from the MOCN GW 609 to the target eNB 612. In some such embodiments, the time required to establish the S1 bearer is added to the amount of time required to flush the traffic from the source eNB 604. However, in other embodiments, establishing the S1 bearer is completed before the source eNB 604 has flushed the packets that remain. Therefore, in such cases there is no need to add the amount time required to establish the S1 bearer to the amount of timer required to flush the traffic from the source eNB 604.

Once all the packets that remained in the source eNB 604 have been flushed (i.e., transmitted from the source eNB 604 to the UE 302), the source eNB 604 sends a handover command to the UE 302. In response, the UE 302 establishes the data radio bearer 710 with the target eNB 612 and releases the data radio bearer 506 with the source eNB 604.

Ideally, the MOCN GW 609 has already established the S1 bearer 706 and determined when to stop sending packets to the source eNB 604 and start sending the packets to the target eNB 612 over the S1 bearer 706 by making an accurate prediction of the amount of time required to flush any remaining packets from the source eNB 604. In some embodiments, the MOCN GW 609 starts sending traffic to the target eNB 612 immediately upon determining that all the packets have been flushed from the source eNB 604. In other embodiments, the MOCN GW 609 determines whether the UE 302 has acknowledged completion of the handover command 708 (i.e., establish the data radio bearer 710 between the target eNB 612 and the UE 302). In some such embodiments, the MOCN GW 609 only begins sending traffic to the UE 302 through the target eNB 612 upon completion of the UE handover. Therefore, traffic to the source eNB 604 may be stopped before traffic to the target eNB 612 starts, and the amount of time between these two events is determined in some embodiments by the amount of time required to ensure that all the traffic that was sent to the source eNB 604 has been cleared. At that time, the data radio bearer 506 to the UE 302 can be taken down (i.e., the UE 302 can complete the handover to the target eNB 612).

An accurate prediction will result in a well-coordinated transition between the source eNB 604 completing the flush of all traffic previously sent by the MOCN GW 609 with beginning of traffic flowing to the target eNB 612. A well-coordinated transition is most efficient since all the packets that were originally sent to the source eNB 604 for transmission to the UE 302 arrive at the UE 302 and the gap in time between the end of traffic from the source eNB 604 and beginning of traffic flowing from the target eNB 612 to the UE 302 is eliminated or minimized. Note that in the ideal case of an accurate prediction of the amount of time required to flush the traffic from the source eNB 604, the sequence of packets to the UE 302 flows without either interruption or the need to retransmit any packets. That is, the transition of the traffic through the source eNB 604 to traffic flowing through the target eNB 612 should occur just as the UE 302 is leaving the data radio bearer 506 to the source eNB 604 after having received all the packets that the source eNB 604 received and the new data radio bearer 710 with the target eNB 612 has been established and is ready for the traffic to continue through the target eNB 612.

Once the data radio bearer 710 is ready, the target eNB 612 sends a handover acknowledge message 712 to the MOCN GW 609. The target eNB 612 can then send to the UE 302 the traffic that the target eNB 612 has queued and/or is then receiving. Note that if the prediction was accurate, few if any packets will have been queued in the target eNB 612.

It should be noted that in some embodiments, the MOCN GW 609 will have sufficient control over the traffic flow that all decisions in the above-noted procedure can be made without the MOCN GW 609 communicating and coordinating with the EPC 307 (and more particularly, with the MME (see FIG. 4) within the EPC 307). However, in some alternative embodiments, the MOCN GW 609 may need to coordinate with the EPC 307 to stop the routing of traffic to the source eNB 604 and to establish the S1 bearer 706 between the MOCN GW 609 and the target eNB 612. Furthermore, such coordination may also be necessary to make the switch to start sending traffic to the target eNB 612.

In addition, in some embodiments, the condition of the data radio bearer 506 between the source eNB 604 and the UE 302 may be in very poor condition. In embodiments, traffic that is particularly sensitive to delay are pushed through the data radio bearer 506 between the source eNB 604 and the UE 302, but other packets that can tolerate greater delay flow from the source eNB 604 to the target eNB 612 through an X2 gateway 311 via an X2 bearer 514, 515 so that they can be sent over a data radio bearer 710 between the target eNB 612 once that bearer is established. Accordingly, a hybrid approach is used in which some traffic flows from the source eNB 604 to the target eNB 612, while other traffic is cleared from the source eNB 604 by pushing it through the data radio bearer 506 associated with the source eNB 604. In some embodiments, rather than transmitting traffic between the source eNB 604 and the target eNB 612 over an X2 interface, the S1 signaling interface can be used as a path for traffic that remained in the source eNB 604 after the decision was made to hand over service to the target eNB 612. That is, the source eNB 604 sends any remaining packets that can tolerate delay over the S1 signaling interface with the MOCN GW 609 (or alternatively through to the MNO EPC 307) and then on to the target eNB 612 over the S1 signaling interface between either the MOCN GW 609 or the MNO EPC 307 and the target eNB 612.

In addition, in some embodiments, a degradation of service may be anticipated. In some such embodiments, rather than waiting for the conditions to deteriorate, traffic through the source eNB 604 will be halted, and any remaining packets in the source eNB 604 are flushed. This ensures that the quality of the data radio bearer 506 remains sufficiently high to allow all packets to be flushed from the source eNB 604 to the UE 302. Several methods can be used to predict a degradation in service, including the use of artificial intelligence to make such predictions based on operational parameters, such as bit error rate, packet error rate, signal strength, fluctuations in power, interference levels, signal to noise level, etc. In some embodiments, the determination can be made as to how much data may be flushed in a predetermined time under the deteriorating conditions, so that the time at which the MOCN GW 609 should cease sending traffic to the source eNB 604 and start sending traffic to the target eNB 612 can be accurately predicted.

Ideally, the timing is such that the source eNB 604 can clear all the traffic before the data radio bearer 506 is lost so that no packets need to be retransmitted from the MOCN GW 609 (or the MNO EPC 307).

In some embodiments in which a UE 302 has several traffic streams, each having a unique set of bearers between the UE 302 and the MNO EPC 307, timing for each set of bearers can be determined independently of the other bearers used for other traffic streams. Therefore, the time at which switching between the downlink S1 bearers occurs can be different for the S1 bearers used for each unique traffic stream.

Furthermore, some streams may be less sensitive to delay. In such cases, for traffic streams that are less sensitive to delay can have packets queued in the source eNB 604 and sent back through either an S1 interface or X2 interface to the target eNB 612, rather than flushing them to the UE 302.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above-disclosed embodiments.

For example, the MNO network functional blocks, including the network core, may be replaced with any unit that controls a mobile communications network. In some embodiments, the BS/AP is any device capable of providing wireless access for a UE to the network. In some embodiments, the BS/AP may be any telecommunications node of a mobile communication network, that adheres to a networking industry standard (e.g., the Universal Mobile Telecommunications System (UMTS) standard).

In some embodiments, the MOCN may be replaced with any core for a network that allows multiple operators. In some embodiments, the MOCN operates with Multi-Operator Radio Access Networks (MORANs) or Radio Access Network sharing.

Terms and phrases used in this document, and variations thereof, unless otherwise expressly stated, should be construed as open-ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all the various components of a module, whether control logic or other components, can be combined in a single package or separately maintained and can further be distributed in multiple groupings or packages or across multiple locations.

Additionally, the various embodiments set forth herein are described with the aid of block diagrams, flowcharts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for performing a handover of communications with a User Equipment (UE), the handover occurring between a source base station/access point (BS/AP) and a target BS/AP within an enterprise network, the handover causing traffic between Mobile Network Operator Evolved Packet Core (MNO EPC) and the UE to switch from an original path to a new path, in the original the traffic travels between the MNO EPC and the UE via the source BS/AP, in the new path the traffic travels between the MNO EPC and the UE via the target BS/AP, the method comprising:

a) determining, by a Multi-Operator Core Network Gateway (MOCN GW), a determined amount of traffic, the determined amount of traffic being an amount of traffic queued within the source BS/AP for transmission to the UE at a stop time, the stop time being a time when the source BS/AP stops receiving additional intended traffic; continuing to send the traffic queued from the source BS/AP to the UE;

b) determining, by the MOCN GW, a determined time at which to start sending traffic to the target BS/AP based upon the determined amount of traffic queued within the source BS/AP from the source BS/AP; and c) sending traffic to the target BS/AP at the determined time, after the determined time, sending the traffic between the MON EPC and the UE along the new path, the target BS/AP being associated with the enterprise network;

wherein traffic traveling between the MNO and the UE travels through the MOCN GW, traffic is not required to be sent from the source BS/AP to the target BS/AP and then to the UE during the handover, and routing the traffic via an X2 gateway is not required.

2. The method of claim 1, wherein determining the determined time is based on a prediction of the amount of time required to flush the determined amount of traffic queued within the source BS/AP.

3. The method of claim 2, wherein the prediction of the amount of time required to flush the determined amount of traffic from the source BS/AP is based on a prediction of the amount of traffic likely to be present in the source BS/AP at the stop time.

4. The method of claim 1, wherein the Multi-Operator Core Network Gateway (MOCN GW) sends traffic to the target BS/AP.

5. The method of claim 4, wherein the MOCN GW is located in a demilitarized zone (DMZ).

6. The method of claim 5, wherein traffic sent to the source BS/AP and to the target BS/AP originates at a Mobile Network Operator (MNO) Evolved Packet Core (EPC).

7. The method of claim 6, wherein traffic includes both user plane and control plane traffic.

8. The method of claim 7, wherein the MOCN GW sends traffic to the source BS/AP over an existing S1 uplink/downlink (UL/DL) bearer.

9. The method of claim 8, further including:
 a) the source BS/AP making a determination to perform a handover; and
 b) the source BS/AP sending a handover request to the MOCN GW.

10. The method of claim 9, further including elevating the priority for the traffic queued within the source BS/AP for transmission to the UE at a stop time, to be higher than had the traffic queued not been queued in the source BS/AP for transmission to the UE at a stop time.

11. The method of claim 10, wherein the priority is elevated to the highest priority possible.

12. The method of claim 11, further including determining a bearer time, the bearer time being the amount of time required to establish an SI bearer from the MOCN GW to the target BS/AP and adding the bearer time to the determined time.

13. The method of claim 12, further including the source BS/AP sending a handover command to the UE in response to the determined amount of traffic being flushed from the source BS/AP.

14. The method of claim 13, further including the MOCN GW sending traffic to the target BS/AP in response to the receiving confirmation that all of the determined amount of traffic has been flushed from the source BS/AP.

15. The method of claim 14, further including buffering traffic in the MOCN GW between the time the MOCN GW stops sending traffic to the source BS/AP and the time the MOCN GW starts sending traffic to the target BS/AP.

16. The method of claim 15, further including sending the buffered traffic from the MOCN GW to the target BS/AP upon starting to send traffic to the target BS/AP upon completion of a UE handover.

17. The method of claim 16, further including:
 a) establishing a data radio bearer between the UE and the target BS/AP; and
 b) taking down a data radio bearer between the UE and the source BS/AP to complete the UE handover.

18. The method of claim 17, wherein the MOCN GW stops sending traffic to the source BS/AP independent of the MNO EPC.

19. The method of claim 17, wherein the MOCN GW starts sending traffic to the target BS/AP independent of the MNO EPC.

20. The method of claim 2, wherein the prediction of the amount of time required amount of traffic currently queued from the source BS/AP is accurate enough to reduce interruptions and reduce needs to retransmit packets to less than were the prediction not relied upon.

* * * * *